United States Patent Office 3,347,300
Patented Oct. 17, 1967

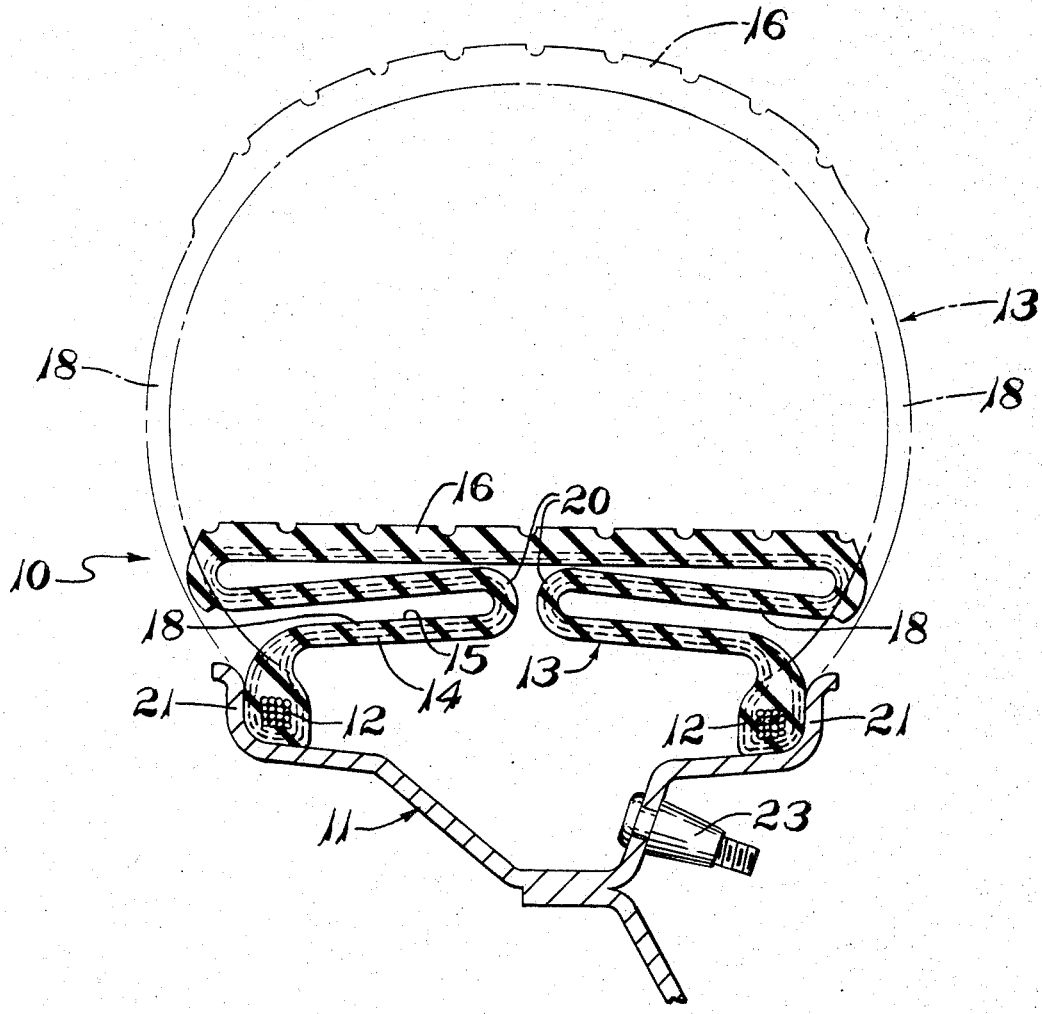

3,347,300
TIRE
James Sidles, Cuyahoga Falls, Ohio, assignor to The
B. F. Goodrich Company, New York, N.Y., a corporation of New York
Filed July 20, 1965, Ser. No. 473,441
11 Claims. (Cl. 152—352)

This invention relates to pneumatic tires, and more particularly to an improved pneumatic tire especially adapted for intermittent load-carrying service such as on spare-tire wheels ordinarily carried in automotive vehicles, or on aircraft wheels.

According to this invention, this improved pneumatic tire has a flexible fold permanently set in the sidewall region of its carcass so that the external diameter and overall lateral width of the tire are very much smaller when it is deflated than when it is inflated. For example, a passenger car tire made according to this invention may have its outside diameter (measured at the crown of the tread) in the order of 30 to 40% smaller when the tire is deflated than when it is inflated. The lateral width of the tire may be about 10% smaller when deflated than when inflated. Accordingly, the total space occupied by a tire-and-wheel assembly using such tire is about 50% smaller when the tire is deflated than when the tire is inflated. For aircraft service, there may be an even greater difference in the size and overall volume between the deflated and inflated condition of a typical tire-and-wheel assembly.

A tire embodying this invention may be made with conventional service-proven tire-making components and materials. That is to say, the tire has a pair of laterally spaced annular inextensible beads with an interconnecting flexible carcass of elastomer-coated tire ply fabric and an external ground-engaging tread. The fold in the flexible sidewall region of the carcass is permanently set by molding the sidewall region when the tire is vulcanized so that the sidewall region is folded on itself and extends inside the tread portion of the tire carcass. The fold forms a continuous uninterrupted reentrant channel in the flexible sidewall region open to the outside surface of the tire carcass. These tires are also made for mounting on industry-standard style wheels or rims.

These tires are normally maintained in their smaller deflated condition on their respective service wheels, and are inflated to their larger operating size only during the periods the wheels are in actual operating or load-carrying service. Owing to the inherent stiffness of the flexible carcass, and the elasticity of the elastomer matrix of the carcass, a tire of this type normally assumes and remains in the collapsed or folded configuration in which it has been molded so long as it is deflated and is otherwise free of externally applied deforming forces. During inflation, the flexible folded portion of the sidewall region is displaced so that it flexibly unfolds, and the carcass portion is elastically expanded by the inflation medium until the tire carcass assumes the characteristic open-bellied toroidal shape of a common pneumatic tire of the prior art. When fully inflated, these tires look and operate substantially like any prior art tire of corresponding size for the same service. On subsequent deflation, however, the carcass region elastically contracts to collapse the tire to its initial smaller size, with the sidewall region refolding into the original molded configuration.

For automotive service the principal utility of this improved tire is in the space-saving advantages it provides during the period the tire is stored in the vehicle before it is placed in actual load-carrying service. The improved tire is ordinarily mounted on a regular spare wheel and may be stored in the vehicle indefinitely in deflated condition. It is quickly inflated with a bottle of compressed gas or other available inflation equipment when it is eventually mounted on a vehicle wheel for load carrying.

For aircraft service, tires according to this invention are inflated only for landing and taxiing or parking, and are deflated whenever the aircraft is airborne and the wheels are retracted into their wheel wells. This advantageously eliminates the inherent hazard of storing a tire inflated to a high pressure inside an aircraft wheel well where the tire could possibly fail explosively. Moreover, these improved tires may be proportioned so that in their smaller inflated condition they will fit easily inside the wheel weels, but the may be inflated to a size very much larger than the wheel well, after the wheels are extended. These effectively larger size tires are more desirable for ordinary landing operations and they make it feasible to operate many existing aircraft on rough unimproved runways. Systems for in-flight inflation and deflation are well within the present state of the art.

A tire made in accordance with and embodying this invention is shown in the accompanying drawing as one example of the manner in which this invention may be practiced.

The drawing more particularly shows a cross section of a collapsible or folding tire designed for passenger automobiles and mounted on a conventional passenger car rim. The cross section of the tire when deflated is shown in solid lines and the inflated cross section is shown in chain-dotted lines.

Referring to the drawing, the tire 10 is mounted on a standard drop-center type automotive rim 11. Structurally, the tire 10 has a pair of annular laterally spaced inextensible beads 12 with a flexible carcass 13 extending between and fastened to each of the beads. The carcass includes two fabric plies 14, 15 and an external ground-engaging tread portion 16.

The foregoing components of the tire are preferably made of conventional service-proven tire-making materials. The beads 12 are preferably wire-wound grommets and the plies 14 and 15 are fastened to the beads all in accordance with common industry practice for building passenger car tires. The plies 14 and 15 are preferably conventional tire cord fabrics (wefted or weftless) such as nylon, rayon, or special polyester cords. The elastomeric coatings on the fabrics are likewise conventional tire-making rubber compounds, as is the tread region 16. The point being made here is that the tire of this invention does not rely on any specially selected materials to provide the improved results.

Additionally, this tire may be built on conventional passenger tire production machinery. That is to say, the tire may be built in cylindrical form according to the so-called flat band tire-making method. The tire cord material from which the plies 14–15 are made is initially coated with an elastomer and then bias cut and laid with the cord angle of successive plies opposing each other in the usual manner. The resulting cylindrical green tire carcass is then axially compressed into a special mold (not shown) which has a molding surface contour for imparting to the tire a permanent molded configuration substantially as shown in solid lines in the drawing.

For passenger car service this tire is preferably molded with a generally "flat" or cylindrical tread portion 16 which has its lateral margins or tread shoulders merging with thinner sidewall regions 18 leading to the beads 12. Each sidewall region 18 is molded so that it has a permanent flexible hairpin-shaped fold 20 extending circumferentially around the tire. That is to say, each sidewall region 18 is folded on itself during the molding operation so that in the deflated condition of the tire, most of the sidewall region between the bead and the tread shoulder extends axially inward and is generally concentric with the tread region 16. The folded regions 20 define in the deflated condition a continuous uninterrupted annular reentrant channel open to the exposed or outside surface of the tire.

The beads 12 of the tire are preferably molded so that they form an interference fit with the adjoining bead seat regions of the wheel rim along the internal surface of the rim flanges 21.

The tire preferably further includes the usual materials and features to enable the tire to operate satisfactorily in tubeless condition. The tire may be inflated or deflated by a standard rim-mounted inflation valve 23.

After the tire is initially mounted on its rim 11, preferably it is inflated just enough to wedge the beads 12 tightly against the respective bead seats of the rim. Thereafter with the tire fully deflated, the beads normally tend to remain snuggly seated in the bead seats in the manner shown. To assist in maintaining the beads properly seated after a mounted tire is deflated, the tire is preferably molded with the beads 12 spaced laterally a slightly greater distance than the actual distance between the inside surfaces of the rim flanges 21.

To place the resulting tire-and-rim assembly in load-carrying service, any suitable inflation mechanism may be used to introduce an inflating medium through valve 23 into the chamber defined by the interior surface of the tire and the rim 11. For passenger cars a pressure bottle of compressed air or carbon dioxide may be used for quick, convenient inflation. Progressive inflation of the tire stretches the carcass circumferentially in the tread region 16 and progressively unfolds the sidewall regions 18. The apieces of the folds, indicated by numerals 20, are displaced laterally away from each other until the tire assumes approximately the generally toroidal shape indicated by the chain dotted lines in the drawing. When fully inflated the tire functions like any other tire of the same class and size. For emergency use in passenger cars, this improved tire may have a significantly thinner tread than would ordinarily be used with a conventional passenger car tire. The thinner tread emergency tire would be operated in load-carrying service only for a period sufficient to enable the main wheel tire to be repaired. By an appropriate selection of the tread dimensions and thread and carcass materials, however, the mileage available for a tire of this class may be varied significantly.

On release of inflation, the elasticity of the carcass portion, including particularly the tread region of the carcass, causes the carcass to return or retract to substantially its original molded shape. During the retraction each sidewall 18–20 automatically refolds to the position, shown in solid lines in the drawing.

The carcass portion of this tire is capable of accommodating the unusually great circumferential elongation of the tread region between the deflated and inflated condition by a combination of the elasticity of the elastomer matrix in which the tire cord fabric is molded and by the pantographing action of the tire cords in the plies 14, 15. A typical type passenger car tire made according to this invention may be built up by wrapping elastomeric coated plies of tire cord 14 and 15 about a cylindrical building drum with the cords forming an angle to the circumference of the building drum of about 60 to 65°. At the conclusion of the building stage, the resulting cylindrical green tire casing is then axially compressed and molded substantially to the shape shown in the solid lines in the drawing. The steps of shaping the green carcass and molding it may shift the original cord angle to about 55–60° to the circumference (or the medial center plane) of the tread. This relatively small shift or "pantographing" of the cords during the molding results from the relatively low profile of the tire and it is very much less than the corresponding action of the cords which normally occurs where a similarly built tire is cured in the familiar toroidal form.

A much greater pantographing or cord angle shift occurs, however, in this type tire during its inflation after it is fully cured. The angle of the cords of the plies 14 and 15 of the tire noted in this example may shift from about 55–60° when the cured tire is in deflated condition, to about 35–45° when the tire is fully inflated. In each case the angle noted is measured from the medical circumference or medial center line of the tire tread. The elastic character of the elastomer matrix in which the cords are molded permits such a radical pantographing action of the cords between the inflated and deflated condition. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a simple balloon.

The foregoing angular ranges have been cited merely to illustrate the order of magnitude of the changes in cord angle which occurs in one specific size passenger car tire from the time the carcass plies are laid up on the cylindrical building drum to the time the tire is fully inflated. The actual selection of cord angles in making these tires will follow conventional practice and will depend primarily on the ultimate shape desired for the tire cross section after it is fully inflated and also on the intended service for the tire. In aircraft tires, for example, the cord angles of the several plies may undergo even greater proportional change than those described in the foregoing example.

The cord angle shifting effect which occurs in this type tire also occurs in other common pneumatic tires. There is a much greater shift in this type tire, however, during its inflation than ordinarily would occur in common tires.

The folds 20 in the sidewall regions 18 of the illustrated tire are in substantial axial alignment with each other. Each extends almost to the medial circumferential center line of the tread region 16. The axial depth of each fold 20 may be varied depending on the size and shape desired for the inflated configuration of the tire. If the folds are more shallow than those illustrated, the radial width of the inflated tire would be correspondingly reduced. On the other hand, the radial width of the tire in its inflated condition may be significantly increased by forming the folds 20 of deeper or greater axial extent than those shown and making the folds so that one concentrically overlaps the other.

For aircraft, truck or other heavy-duty service, a tire according to this invention may be made with a great many more plies than the two shown in the drawing, and ordinarily such tires would have a much thicker tread region. Such tires may additionally include other special structural details such as fabric reinforcements of the tread. In any case, however, such tires may be made with at least one permanent inwardly folded region in the sidewall portion of the carcass in accordance with the principles of this invention.

What is claimed is:

1. A pneumatic tire inflatable to a generally toroidal shape, the tire comprising a pair of laterally spaced annular beads and an annular flexible carcass of elastomer-coated fabric with a circumferential tread region and opposing sidewall regions between said tread region and each bead, at least one sidewall region having a flexible fold permanently set in the sidewall region, the opposing sidewall portions at the fold extending in the same general direction as the rotational axis of the tire and circumferentially of the carcass in a continuous reentrant channel opening to the outside surface of the sidewall in the deflated condition of the tire and adapted to unfold and assume a generally toroidal shape when the tire is inflated; said tread region having an annular margin adjoining said folded sidewall which normally has a diameter only slightly larger than the bead diameter when the tire is deflated, and said tread region being elastically distensible when the tire is inflated to increase the diameter of said tread margin to a size much larger than the bead diameter.

2. A tire according to claim 1 having said fold in each sidewall region.

3. A tire according to claim 2 wherein the folds of said opposing sidewall regions are substantially axially aligned with each other.

4. A tire according to claim 3 wherein said sidewall folds terminate substantially at the medial center of said tread.

5. A pneumatic tire comprising laterally spaced beads, and an elastically distensible carcass of elastomer-covered fabric which includes a ground-engaging external tread region and opposing flexible sidewall regions between the tread and the bead, each sidewall region having a flexible fold permanently set in the sidewall region, the fold extending circumferentially of the carcass in a continuous reentrant channel on the outside surface of the carcass and underlying said tread region when the tire is deflated, and said tread region having its normal diameter not appreciably different from the bead diameter of the tire when the tire is deflated, and said tread region being elastically distensible to a much larger diameter to unfold said sidewalls when the tire is inflated.

6. A pneumatic tire according to claim 5 in which said folds are in axial opposed relation and are substantially concentric with said tread region.

7. A pneumatic tire according to claim 5 in which said elastomer-covered fabric includes bias-laid tire cord fabric and wherein the elastomer covering said cords has sufficient elasticity in its vulcanized state to accommodate shifting of said cords in said carcass to significantly different angles to the medial circumferential center of the tread region between the inflated and the deflated position of the tire.

8. A vulcanized inflatable tire having an annular flexible carcass of elastomer-covered fabric which carcass includes a pair of annular beads connected by sidewall portions to an annular tread portion, the margins of the tread portion normally being about the same diameter as the beads and the sidewall portions normally being folded toward the beads and concentrically overlapped by the tread portion when the tire is deflated, and said carcass portion being elastically distensible by the tire inflating medium so that said tread margins are circumferentially elongated to a diameter much larger than the beads and said sidewall portions are unfolded from inside the tread portion when the tire is inflated.

9. A tire according to claim 8 in which the entire tread portion is normally about the same diameter as the beads when the tire is deflated, and said tread portion elongating to an inflated diameter much larger than the bead diameter.

10. An inflatable tire according to claim 8 in which said elastomer-covered fabric of said carcass comprises bias-laid cords and wherein the elastomer covering said cords has sufficient elasticity in its vulcanized state to allow shifting of said cords in said folded portion of the carcass to significantly different angles relative to the medial circumferential center of said carcass between said inflated and deflated positions to accommodate said diameter changes of said tread margins.

11. A vulcanized pneumatic tire having an annular flexible carcass of elastomer-covered fabric terminating in a pair of annular beads, a portion of the carcass being normally folded on itself circumferentially of the tire so that the folded portion is concentrically overlapped by other portions of the tire carcass when the tire is deflated and said folded portion being adapted to unfold in response to an inflating medium when the tire is inflated, regions of said folded portion being of appreciably smaller circumferential diameter in their deflated folded position than in their unfolded inflated position, and said elastomer-covered fabric including bias-laid cords in an elastomer matrix which has sufficient elasticity in its vulcanized state to allow shifting of said cords in said folded portion of the carcass to significantly different angles relative to the medial circumferential center of said carcass between said inflated and deflated positions to accommodate said diameter changes in regions of said folded portion of the carcass.

References Cited

UNITED STATES PATENTS 2,882,738  4/1959  Camenzino _____ 152—330 X

ARTHUR L. LA POINT, *Primary Examiner.*

C. W. HAEFELE, *Assistant Examiner.*